(12) United States Patent
Shirasaki

(10) Patent No.: US 7,616,580 B2
(45) Date of Patent: Nov. 10, 2009

(54) ADAPTIVE CLOCK METHOD AND SYSTEM

(75) Inventor: Yoshio Shirasaki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 653 days.

(21) Appl. No.: 11/459,228

(22) Filed: Jul. 21, 2006

(65) Prior Publication Data

US 2007/0002872 A1 Jan. 4, 2007

Related U.S. Application Data

(63) Continuation of application No. 10/153,819, filed on May 24, 2002, now Pat. No. 7,103,052.

(30) Foreign Application Priority Data

May 25, 2001 (JP) ............................. 2001-157185

(51) Int. Cl.
*G01R 31/08* (2006.01)
(52) U.S. Cl. .................. 370/242; 370/412; 370/395.61; 370/236.2; 370/241.1
(58) Field of Classification Search ........................ None
See application file for complete search history.

(56) References Cited

U.S. PATENT DOCUMENTS

| 5,396,492 A | 3/1995 | Lien |
| 6,026,074 A | 2/2000 | Stadler et al. |
| 6,034,995 A * | 3/2000 | Eisele et al. ................. 375/257 |
| 6,418,144 B1 | 7/2002 | Saeki |
| 6,744,735 B1 * | 6/2004 | Nakaguro .................... 370/242 |
| 2001/0043596 A1 | 11/2001 | Shimanuki et al. |
| 2006/0203717 A1 * | 9/2006 | Puppa et al. ................. 370/216 |

FOREIGN PATENT DOCUMENTS

| JP | 07-046257 | 2/1995 |
| JP | 9-326804 | 12/1997 |
| JP | 09-326804 | 12/1997 |
| JP | 10-271122 | 10/1998 |
| JP | 11-136242 | 5/1999 |

* cited by examiner

*Primary Examiner*—Duc C Ho
(74) *Attorney, Agent, or Firm*—Harrity & Harrity, LLP

(57) ABSTRACT

A device and method are disclosed for correctly restoring a read clock when there are a plurality of STM data stream transmission sources. In a CES device of an ATM communication system, ATM cells from respective connections, which are to be delivered to the same outgoing line, are accumulated in a reassembly buffer memory and a PLO control unit aggregates the amount of ATM cells accumulated in the reassembly buffer memory for each connection. Subsequently, the PLO control unit calculates the frequency of a read clock based on the amount of accumulated ATM cells for each connection. A PLO restores the read clock which is applied to read data from the reassembly buffer memory for delivery to an STM network.

20 Claims, 7 Drawing Sheets

ADAPTIVE CLOCK METHOD AND SYSTEM

RELATED APPLICATION

This application is a continuation of U.S. patent application Ser. No. 10/153,819 filed May 24, 2002, the entire disclosure of which is incorporated herein by reference.

BACKGROUND OF THE INVENTION

1. Field of the Invention

The present invention relates to a reassembly buffer device for controlling data transmission in an ATM network, a device for circuit emulation service, and an ATM communication system.

2. Description of the Related Arts

A circuit emulation service (CES) device for use in fixed rate data transmission control in an Asynchronous Transfer Mode (ATM) network generally has a segmentation function and a reassembly function.

The segmentation function refers to a function of converting a Synchronous Transfer Mode (STM) data stream to ATM cells in accordance with ATM Adaptation Layer 1 (AAL1), and the reassembly function is another function possessed by the AAL1 to restore the STM data stream from ATM cells.

FIG. 1 illustrates an exemplary configuration of an ATM communication system which is equipped with the CES device.

As illustrated in FIG. 1, CES device 110 is installed between ATM network 120 and STM network 130.

CES device 110 has segmentation means 111 for implementing the segmentation function, and reassembly means 112 (reassembly buffer means) for implementing the reassembly function.

With the foregoing configuration, CES device 110 provided in ATM communication system 100 can convert an STM data stream from STM network 130 to ATM cells in accordance with AAL1 in segmentation means 111 and transmits the ATM cells to ATM network 120 at CBR (Constant Bit Rate).

Then, CES device 110 can terminate ATM cells from ATM network 120 at reassembly means 112 in accordance with AAL1 to restore an STM data stream.

In the configuration as illustrated in FIG. 1, when a sending STM network and a receiving STM network are placed in a plesiochronous environment such as an international communication, an adaptive clock method must be used to transfer clock information and restore a clock on the reception side.

FIG. 2 illustrates an exemplary configuration of a conventional reassembly means for implementing the adaptive clock method.

As illustrated in FIG. 2, conventional reassembly means 112 accumulates AAL1 payload data in reassembly buffer memory 112-1, controls the frequency of a local clock based on a level to which reassembly buffer memory 112-1 is filled, and drives PLO 112-2 based on the controlled local clock to read ATM cells, thereby implementing the adaptive clock method.

As appreciated, reassembly buffer memory 112-1 is provided for absorbing delays and fluctuations in ATM network 120.

The frequency of the local clock is controlled by driving PLO (Phase Locked Oscillator) 112-2 for use in supplying the local clock such that the filling level of reassembly buffer memory 112-1 is regulated substantially at the center thereof.

Also, the filling level of reassembly buffer memory 112-1 can be maintained between two limit values for preventing reassembly buffer memory 112-1 from overflowing and underflowing.

In recent years, a variety of improvements have been proposed on STM data stream synchronous transmission approaches in CES devices using the adaptive clock method.

For example, an example of the prior art for generating a synchronization clock from an ATM cell stream using the adaptive clock method is disclosed in Japanese Patent Application Laid-open No. Hei 7-46257 (46257/95), entitled "Adaptive Clock Restore Method and Apparatus."

The adaptive clock restore method and apparatus disclosed in this official gazette, as illustrated in FIG. 3, comprise CES IWF (CBR Emulation Service InterWorking Function) installed between ATM network 120 for receiving STM data streams from a plurality of transmission sources a-n and a synchronization based terminal, not shown represented by TDM (Time Division Multiplexer) or the like as CES device 110 for terminating the ATM protocol to convert data between TDM and ATM.

This CES IWF monitors reassembly buffer memory 112-1 (a FIFO buffer is used in a conventional adaptive clock restore method and apparatus) for data accumulated therein, controls the frequency of a read clock in accordance with a difference of the accumulated data from a predetermined target value and reads data from reassembly buffer memory 112-1 based on the controlled read clock.

Also, in the network configuration having the CES IWF one communication connection (CBR virtual circuit) is set between synchronization based terminals.

Therefore, a synchronization clock can be restored from an asynchronous packet stream such as an ATM cell stream.

Another example of prior art CES device for implementing the adaptive clock method is disclosed in Japanese Patent No. 2842379 entitled "Synchronization Control Apparatus and Synchronization Control Method."

As illustrated in FIG. 4, the synchronization control apparatus and synchronization control method disclosed in this patent comprise reassembly buffer memory 112-1 (memory means); PLO 112-2 (correcting means) for controlling the frequency of a read clock based on the amount of data accumulated in this reassembly buffer memory 112-1; and the like. These components are provided for each time slot.

Thus, a connection is established between an ATM network and synchronization based terminals for each time slot, so that when a free time slot exists within a data frame of a synchronization based terminal on the reception side data from a synchronization based terminal on the other path can be accommodated in the free time slot. In addition, a plurality of paths can be established between the same synchronization based terminals.

However, the conventional adaptive clock restore method and apparatus have a problem that the read clock cannot be correctly restored due to an anomalous amount of accumulated data from a connection between each sending side and the receiving side, caused by a change in the state of the connection, when a single read clock is requested to restored from a plurality of data transmission sources, as is the case with a channelized line.

Specifically, if one of operating connections disclosed or failed data received from this connection cannot be ensured, resulting in a failure in ensuring the amount of received data accumulated in the reassembly buffer memory, and even the read clock which is restored based on the amount of accumulated data.

Therefore, even if other connections are normal, the conventional adaptive clock restore method and apparatus cannot ensure data sent to all outgoing lines, including data in these normal connections.

Also, the conventional synchronization control apparatus and synchronization control method comprise a buffer memory, PLO and the like for each connection to control data read from the reassembly buffer memory based on the amount of data from each connection accumulated in the reassembly buffer memory.

This control policy requires a number of circuits for read-out equal to the number of connections, in spite of a single outgoing line causing an increase in circuit scale.

SUMMARY OF THE INVENTION

The present invention has been made to solve the foregoing problems, and it is an object of the invention to provide a cell data reassembly device, a circuit emulation service device, and an ATM synchronization control method which are capable of correctly delivering STM data streams from normal connections to an outgoing line even if one or two or more connections are faulty on a channelized line, and are capable of detecting a faulty connection and feeding a STM data stream from the connection to the outgoing line when it is recovered to a normal state without introducing an increase in circuit scale.

A first ATM cell reassembly device according to the present invention has an AAL1 terminator for receiving an ATM cell from each connection through an ATM network for termination, and a shared reassembly buffer memory for accumulating an AAL1 payload of the ATM cell received from the AAL1 terminator for absorbing a delay. The ATM cell reassembly device comprises an accumulated amount aggregating unit for aggregating the amount of the AAL1 payload data accumulated in the reassembly buffer memory for each connection, a target value managing unit for holding a target value for the accumulated amount for each connection, a clock calculating unit operative for a first connection to receive the accumulated amount from the accumulated amount aggregating unit and the target value from the target value managing unit, respectively, and to start a correction of a read clock in a comparison of the target value with a count value for the accumulated amount when the count value for the accumulated amount reaches the target value, and also operative for a second and subsequent connections to compare a total sum of count values for so far corrected connections and a current count value with a total sum of previous target values and a target value for a current connection to correct the read clock for the frequency to calculate the frequency, a clock restoring unit for restoring the read clock based on the frequency calculated by the clock calculating unit, and a data reading unit driven by the read clock restored by the clock restoring unit to read the AAL1 payload data from the reassembly buffer memory.

A second cell data reassembly device according to the present invention includes an operating state identifying unit for determining whether or not each connection is normally operated, wherein the clock calculating unit, separately holds the accumulated amount and target value for a faulty connection which is not being normally operated as determined by the operating state identifying unit and corrects the read clock frequency using a normal accumulated amount and a target value of a next connection, and the clock restoring unit restores the read clock based on the frequency corrected by the clock calculating unit.

Further, in a third cell data reassembly device according to the present invention, the clock calculating unit corrects the read clock frequency based on the accumulated amount held for the faulty connection when the operating state identifying unit determines that the faulty connection has been recovered to a normal operating state, and the clock restoring unit restores the read clock based on the frequency corrected by the clock calculating unit.

Further, in the third cell data reassembly device according to the present invention the target value managing unit calculates the target value for the accumulated amount based on a line rate of each connection, and CDV indicative of cell delay variations within the ATM network.

A circuit emulation service device according to the present invention has segmentation means for converting an STM data stream to ATM cells through AAL1 and reassembly buffer means for restoring an STM data stream from AAL1 ATM cells, wherein the ATM cell reassembly device described above is used as the reassembly buffer means.

Further, an ATM synchronization control method according to the present invention is adapted to receive an ATM cell of each connection from an ATM network for termination, accumulates AAL1 payload data of the ATM cell in a shared reassembly buffer memory for absorbing a delay and read the accumulated AAL1 payload data according to the read clock, the method includes the steps of previously holding a target value for the amount of the AAL1 payload data accumulated in the reassembly buffer memory for each connection, aggregating the amount of the AAL1 payload data accumulated in the reassembly buffer memory for each connection calculating the frequency of the read clock based on the accumulated amount and the target value for a first connection, comparing a total sum of count values for the accumulated amounts up to the preceding connection and a current count value with a total sum of target values up to the preceding connection and a target value for a current connection to correct the read clock for the calculated frequency, and restore the read clock for second and subsequent connections, and reading the AAL1 payload data from the reassembly buffer memory according to the restored read clock.

DETAILED DESCRIPTION OF THE PREFERRED EMBODIMENT

In the following, one embodiment of the present invention will be described with reference to the accompanying drawings.

First, a cell data reassembly device (hereinafter called the "reassemblyd device"), a circuit emulation service device, and an ATM synchronization control method according to the present invention will be described with reference to FIGS. 5 and 6.

Figure 1:
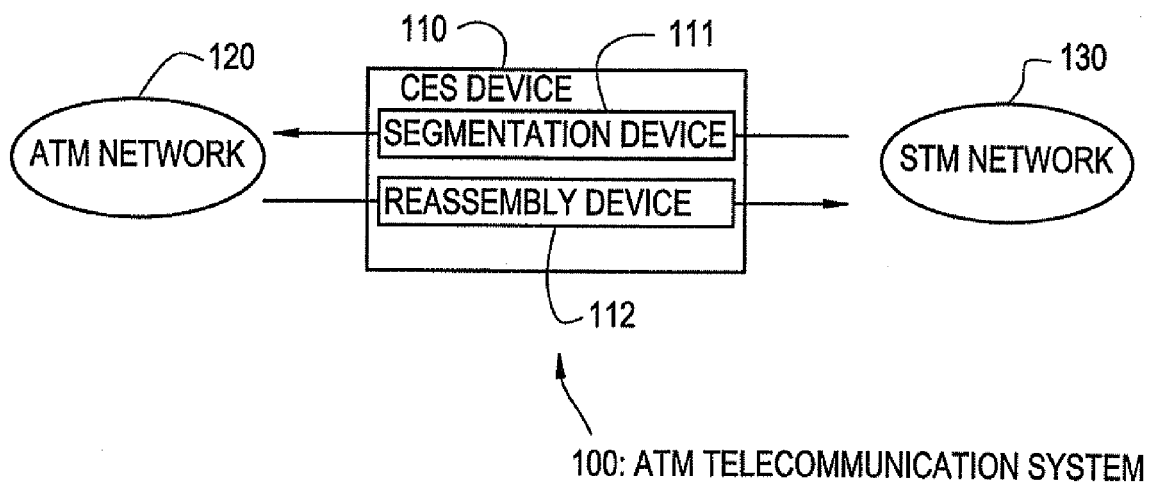
FIG. 1 is a block diagram illustrating the configuration of a conventional ATM communication system.
Figure 2:
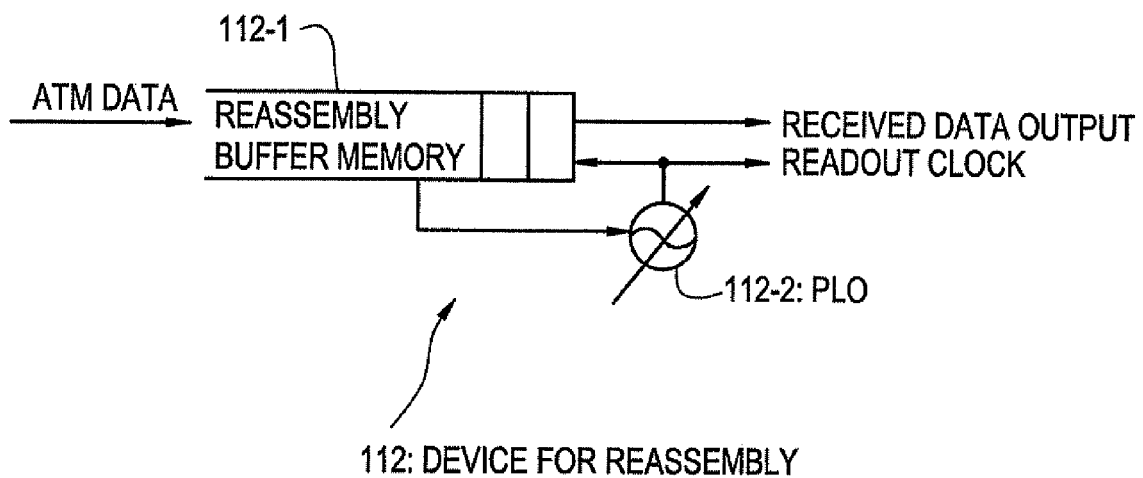
FIG. 2 is a block diagram illustrating the configuration of a reassembly means in the conventional ATM communication system.
Figure 3:
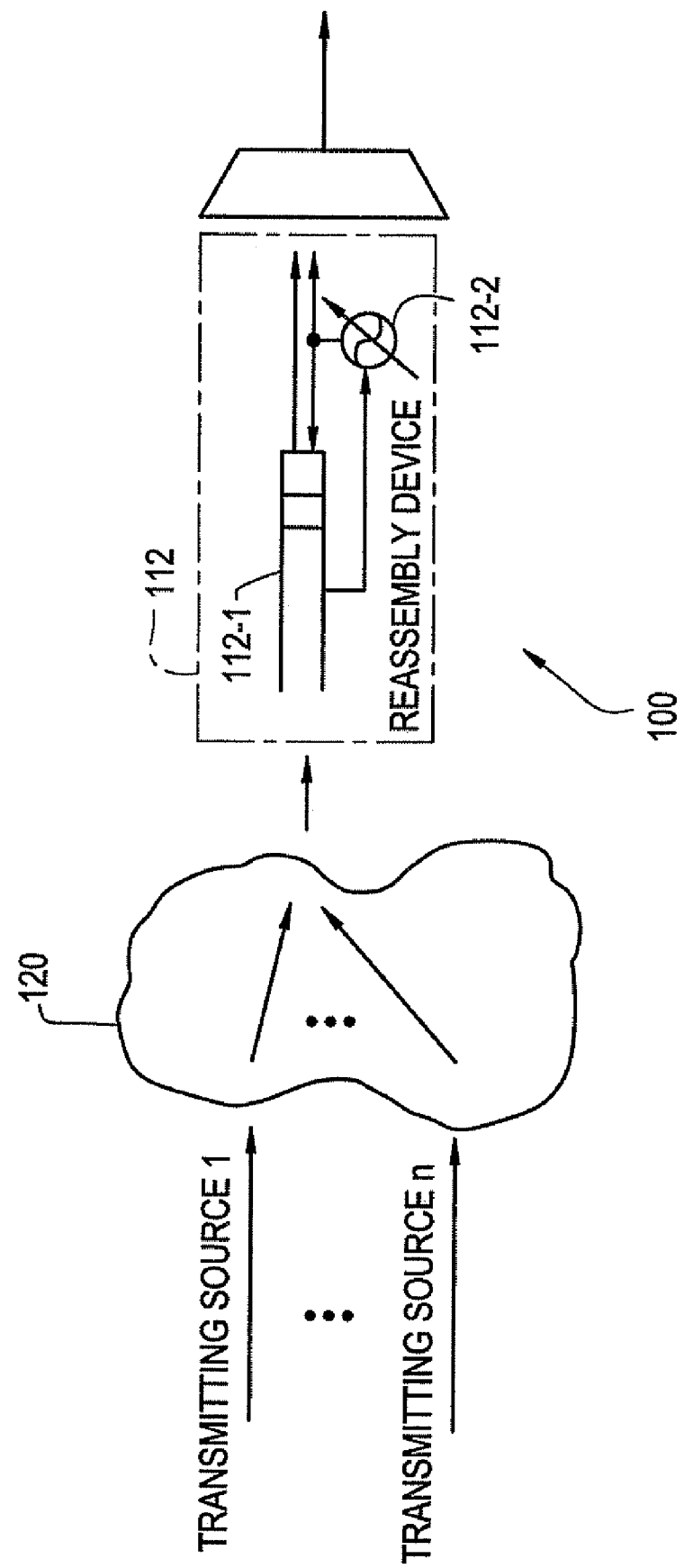
FIG. 3 is a block diagram illustrating the configuration of an ATM communication system which employs the reassembly means illustrated in FIG. 2.
Figure 4:
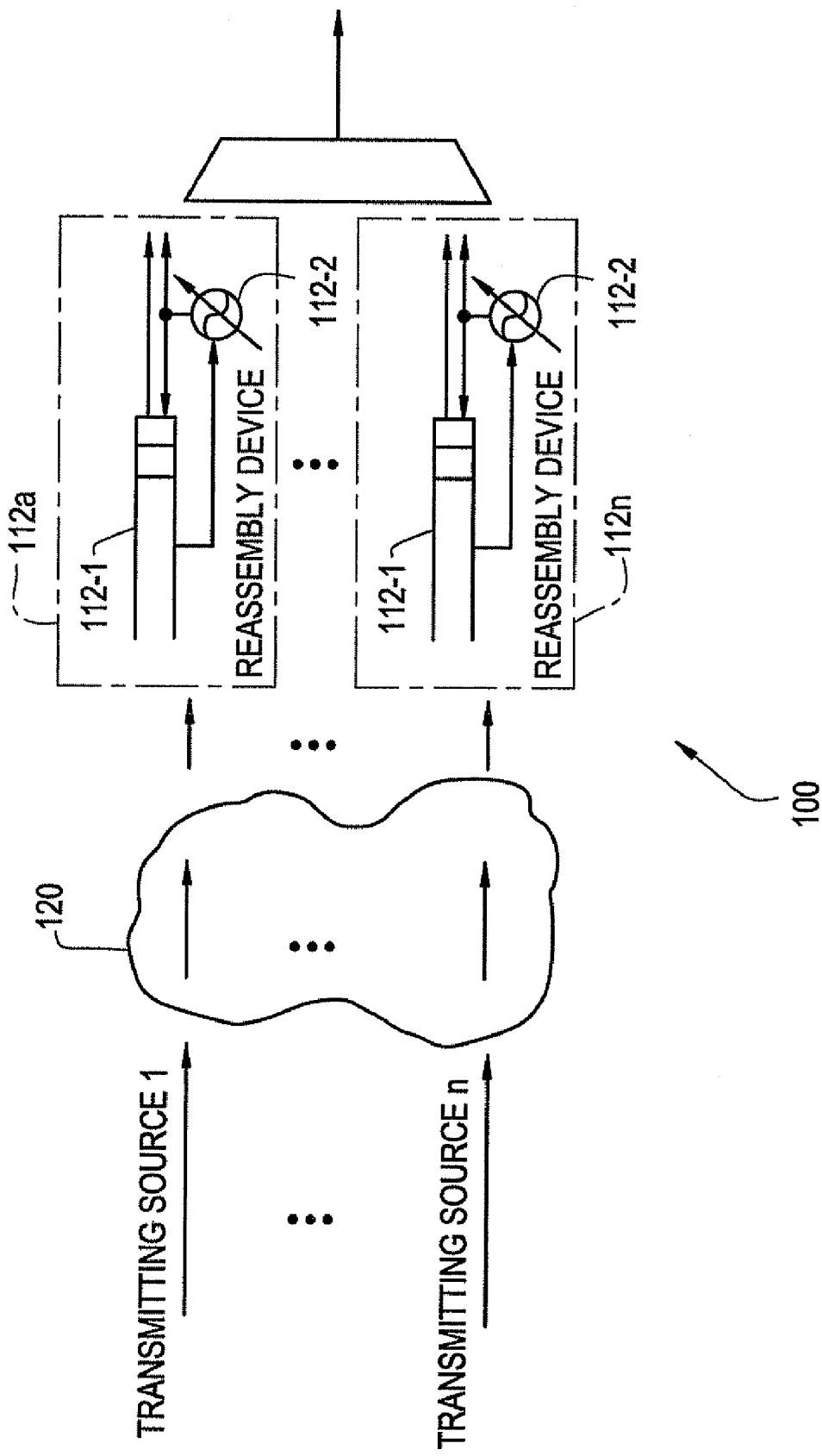
FIG. 4 is a block diagram illustrating an exemplary configuration of an ATM communication system which employs the reassembly means illustrated in FIG. 2.
Figure 5:
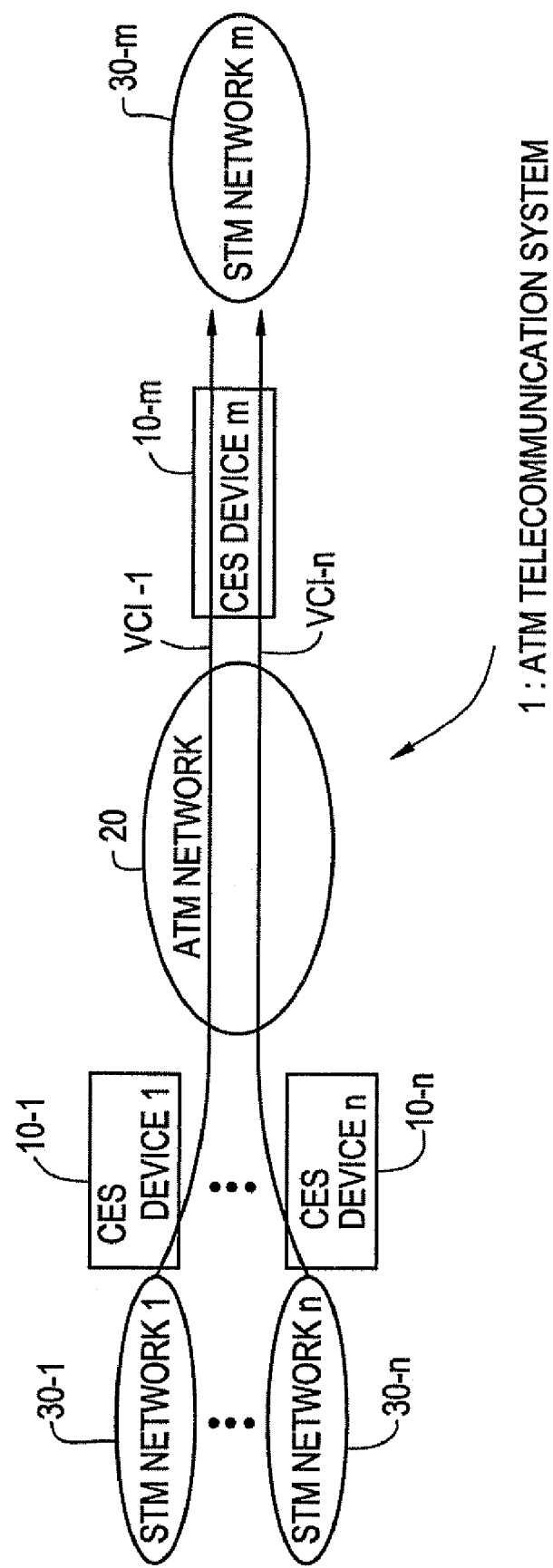
FIG. 5 is a block diagram illustrating the configuration of an ATM communication system according to the present invention.
Figure 6:
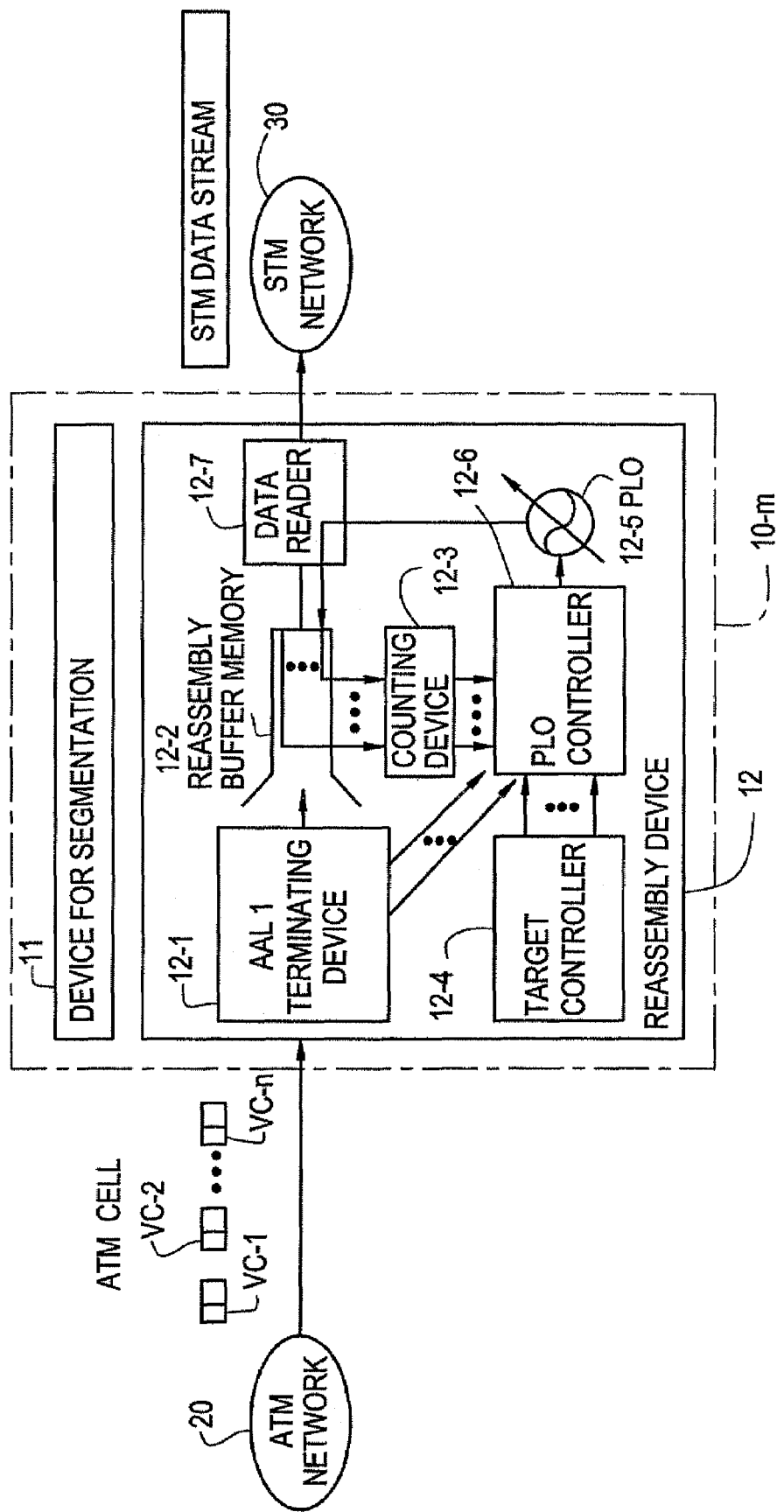
FIG. 6 is a block diagram illustrating the configuration internal to and around a CES device provided in the ATM communication system illustrated in FIG. 5.

FIGS. 5 and 6 are block diagrams illustrating the configuration of an ATM communication system in this embodiment, and the configuration internal to and around CES device m in FIG. 5, respectively.

As illustrated in FIG. 5, ATM communication system 1 comprises CES devices 10-1-10-n, 10-m; ATM network 20; and STM networks 30-1-30-n, 30-m.

Here, CES devices 10-1-10-n, 10-m each comprise segmentation means 11 and reassembly device 12, as illustrated in FIG. 6.

Segmentation means 11 has a segmentation function for converting an STM data stream from STM network 30 to ATM cells in accordance with AAL1.

Reassembly device 12 has a reassembly function, which is performed by AAL1, for restoring an STM data stream from ATM cells.

Reassembly device 12 also comprises AAL1 terminator 12-1; reassembly buffer memory 12-2; counter unit 12-3; target value managing unit 12-4; PLO 12-5; PLO control unit 12-6; and data reading unit 12-7.

AAL1 terminator 12-1 receives ATM cells of each connection from ATM network 20 to terminate the ATM cells. AAL1 terminator 12-1 also detects a fault in each connection. A fault in a connection can be detected by methods such as receiving an alarm OAM cell in the connection, detecting generation of an ATM Header Error Control (HEC) error, an AL1 sequence error and the like.

The result provided by the fault detecting method is notified from AAL1 terminator 12-1 to PLO control unit 12-6.

The AAL1 terminator 12-1 has a function as an operating state identifying unit since it detects faults in connections.

Reassembly buffer memory 12-2 is a delay absorb use buffer memory for accumulating AAL1 payload data of ATM cells to absorb delays. This reassembly buffer memory 12-2 is shared by a plurality of connections.

By sharing reassembly buffer memory 12-2 by a plurality of connections, a read clock at a normal frequency can be generated by providing reassembly device 12 with target value managing unit 12-4, PLO control unit 12-6 and the like.

In addition, by sharing reassembly buffer memory 12-2, rather than providing one for each connection, an STM data stream can be correctly delivered without increasing the circuit scale of CES devices 10-1-10-n.

Counter unit 12-3 (accumulated amount aggregating unit) aggregates the amount of data accumulated in reassembly buffer memory 12-2 for each connection.

Target value managing unit 12-4, which has a memory for holding a target value, not shown, holds a target value for the amount of accumulated data for each connection in reassembly buffer memory 12-2.

Target value managing unit 12-4 also calculates a target value for the amount of accumulated data for each connection. This target value is calculated based on a line rate for each connection, and CDV within the ATM network.

Since the target value can be found for each connection in a manner similar to the accumulated amount by calculating the target value for the accumulated amount based on a line rate for each connection, and CDV within the ATM network, the frequency of a read clock can be calculated in accordance with the state of the connection.

PLO 12-5 (clock restoring unit) generates a read clock for reading data from reassembly buffer memory 12-2.

PLO 12-5 may be implemented by a phase locked oscillator, a phase locked loop or the like.

PLO control unit 12-6 (clock calculating unit) determines the frequency of the read clock generated by PLO 12-5.

The determination of the frequency of the read clock is made based on the amount of accumulated data for each connection in reassembly buffer memory 12-2, supplied from counter unit 12-3, and the notification of fault detection result (fault notification) sent from AAL1 terminator 12-1.

Specifically, when the fault notification is sent from AAL1 terminator 12-1, PLO control unit 12-6 excludes the amount of accumulated data from a connection associated with this fault notification from a calculation for correcting the frequency of the read clock.

By excluding the amount of accumulated data associated with a faulty connection from the calculation for correcting the frequency of the read clock, it is possible to prevent generation of the read clock at an anomalous frequency resulting from the fault.

When a faulty connection is brought back again to an operable normal state at a later time, PLO control unit 12-6 uses the amount of accumulated data in reassembly buffer means 12-2, associated with the connection, in calculating the frequency of the read clock. In this way, the correct read clock can be calculated as well when the operating state of each connection is brought back to a normal state.

Data reading unit 12-7 reads AAL1 payload data from reassembly buffer memory 12-2 and transmits to STM network 30. Data reading unit 12-7 reads the AAL1 payload data based on the read clock generated by PLO 12-5.

ATM communication system 1 in the present invention can provide an arbitrary number of CES devices and STM networks as illustrated in FIG. 5. Assume, however, in the following detailed description on the operation of the ATM communication system, that STS-1 (Synchronous Transfer Signal-1) lines (a total of three lines) of other STM networks 30-1-30-3 are channelized on an STS-3 line of STM network 30-4 as illustrated in FIG. 7 for convenience.

Next, the operation of the ATM communication system having the CES devices will be described with reference to FIGS. 7 and 8.

Figure 7:
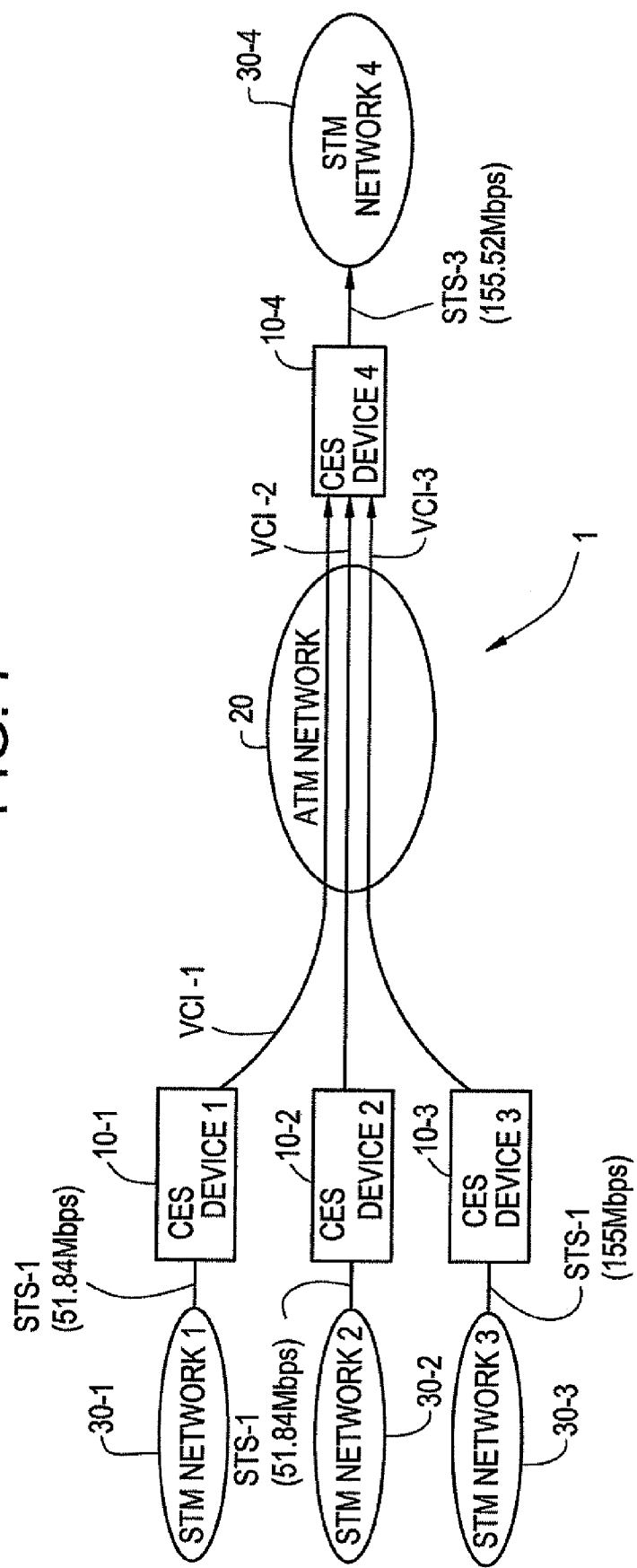
FIG. 7 is a block diagram illustrating a specific example of the ATM communication system illustrated in FIG. 5.
Figure 8:
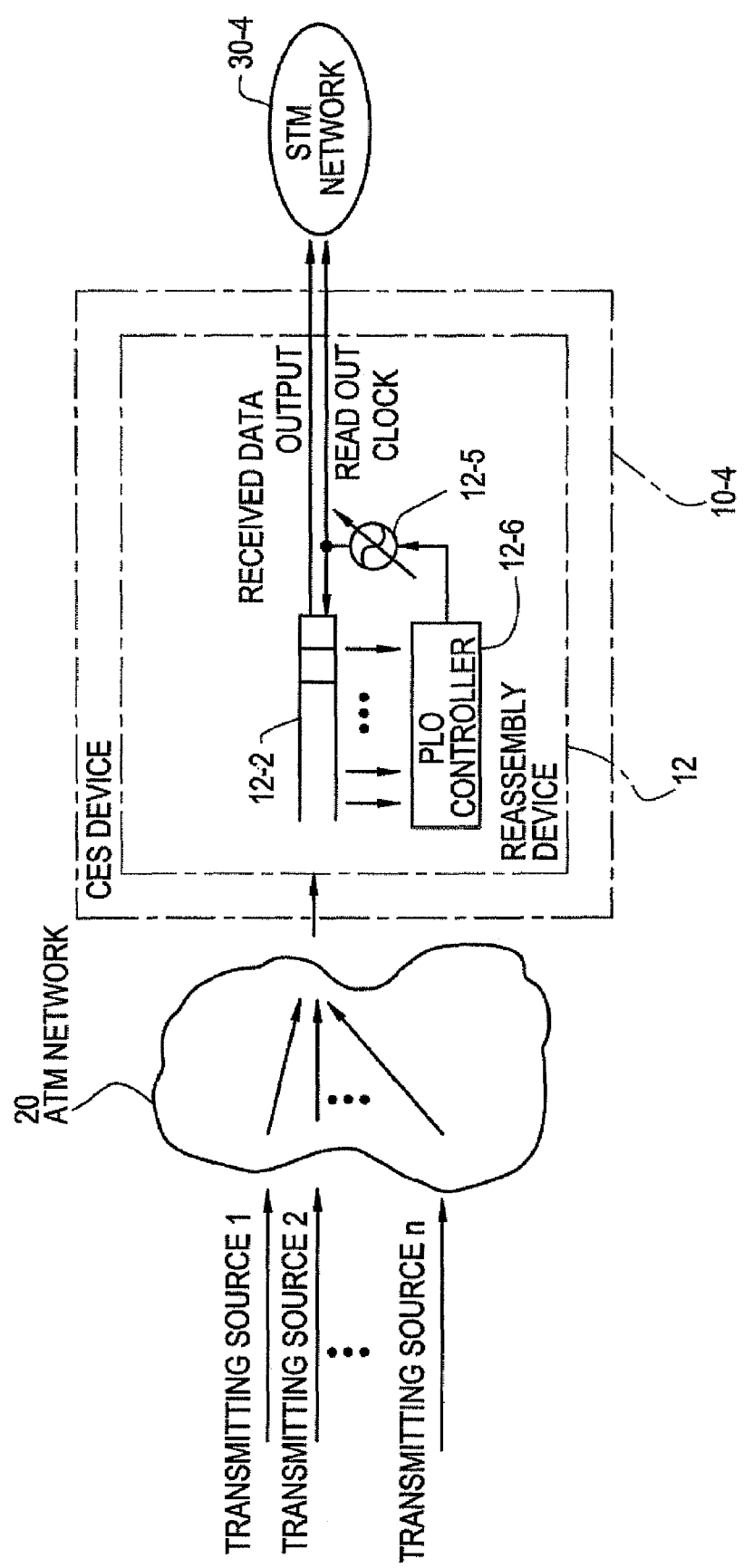
FIG. 8 is a block diagram illustrating the configuration internal to and around a CES device illustrated in FIG. 7.

FIG. 8 is a block diagram illustrating the configuration internal to and around CES device 10-4 in the ATM communication system illustrated in FIG. 7.

As illustrated in FIG. 7 VCI-1 has been established for a connection between CES device 10-1 in STM network 30-1 and CES device 10-4 in STM network 30-4. Similarly, VCI-2 has been established for a connection between CES device 10-2 and CES device 10-4; and VCI-3 for a connection between CES device 10-3 and CES device 10-4.

In CES devices 10-1-10-3 on the transmission side, an STS-1 data stream is converted to ATM cells in accordance with AAL1, and sent to ATM network 20 at CBR.

Further, in CES device 10-4 on the reception side, ATM cells received from each of connections associated with VCI-1-VCI-3 are converted to an STM data stream which is delivered to the STS-3 line.

In ATM communication system 1 having the foregoing configuration, a target value for the amount of accumulated data for each connection is previously set in target value managing unit 12-4 based on the line rate on the transmission side, the line rate on the reception side, and CDV (Cell Delay Variation for example, CDV at each line rate) within ATM network 20 before the connection is operated.

Next each connection is established for starting the operation. Here when connection C-1, for example, is first established to start the operation, an ATM cell reaching connection C-1 is terminated at ALL1 terminator 12-1, and subsequently start to writes into reassembly buffer memory 12-2.

In this event, the read clock determined by PLO control unit 12-6 is generated at an initial frequency. Also, dummy data is inserted, instead of reading data from reassembly buffer memory 12-2, in data reading unit 12-7, and transmitted to STM network 30-4.

Further, a count value for connection 1 is referenced only among the information of accumulated data from counter unit 12-3. When this count value reaches the target value for connection C-1 in target value managing unit 12-4, a correction of the read clock is started, and data from connection C-1 is read from reassembly buffer memory 12-2 and inserted into a time slot assigned to connection C-1.

The read clock is corrected such that the read frequency is increased when the target value for connection C-1 is smaller than the count value for connection C-1, and the read frequency is reduced when the target value for connection 1 is larger than the count value for connection C-1. Also, in this event, dummy data has been previously inserted into time slots for connections VCI-2, VCI-3.

When the operation of connection C-2 is subsequently started, the read clock is corrected only using the count value for connection C-1 until a count value for connection C-2 reaches a target value for connection C-2.

Then, at the time the count value for connection C-2 reaches the target value, a correction of the read clock is started using the count values for connection C-1 and connection C-2, and data from connection C-2 is read from reassembly buffer memory 12-2 and inserted into a time slot assigned to connection C-2.

A simple method of correcting the read clock for the frequency may involve comparing the sum of respective count values with the sum of respective target values to correct the read clock for the frequency, wherein the frequency of the read clock is increased when the sum of the target values for connection C-1 and connection C-2 is less than the sum of the count values for connection C-1 and connection C-2, whereas the frequency of the read clock is reduced when the sum of the target values for connection C-1 and connection C-2 is larger than the sum of the count values for connection 1 and connection 2.

Further, when the operation of connection C-3 is started, the read clock is corrected for the frequency using the count values for connection C-1 and connection C-2 until the amount of accumulated data from connection C-3 reaches a target value. Then, after the amount of accumulated data has reached the target value, PLO control unit 12-6 corrects the read clock for the frequency using the count values for connection C-1, connection C-2 and connection C-3, and PLO 12-5 generates the read clock based on the frequency of the corrected read clock.

Data reading unit 12-7 starts reading data from reassembly buffer memory 12-2 based on the read clock thus generated, and the read data is inserted into a time slot assigned to connection C-3 and sent to STM network 30.

Next, the operation performed when a connection fails will be described with reference to FIG. 7.

If a fault occurs, for example, in VCI-2 after the operation has started in each connection, AAL1 terminator 12-1 identifies the faulty connection, and sends a fault notification indicative of the fault in VCI-2 is sent to PLO control unit 12-6.

PLO control unit 12-6 confirms the fault notification received from AAL1 terminator 12-1, and excludes the amount of accumulated data associated with the STS-1 line indicated by this fault notification from those for use in the calculation for correcting the read clock in PLO control unit 12-6. Specifically, PLO control unit 12-6, when notified of a fault in VCI-2, calculates a corrected frequency for the read clock using only the sum of the amounts of accumulated data from respective connections VCI-1 and VCI-3, and the sum of the target values for the amounts of accumulated data for the respective connections.

By excluding data associated with a faulty connection from the calculation for correcting the read clock for the frequency, it is possible to prevent an anomalous read clock due to the amount of accumulated data from VCI-2. Consequently, data associated with normal connections can be correctly sent to STM network 30 based on the read clock.

Subsequently, when VCI-2 is again brought back to an operable normal state, the amount of accumulated data from VCI-2 is used for calculating the frequency of the read clock after confirming that the amount of accumulated data from VCI-2 reaches the target value in the reassembly buffer memory 12-2. It is therefore possible to calculate a correct read clock even when any connection changes in the operating state.

As described above, according to the present invention, in a channelized circuit emulation system which receives STM data streams through a plurality of connections established between a plurality of ATM cell data transmission sources and a destination network, and restores a read clock based on the amount of data accumulated in the buffer associated with these connections, the read clock can be restored based only on the amounts of accumulated data from normal connections, so that the STM data streams can be correctly sent to an outgoing line.

As compared with a conventional approach which provides a reassembly buffer memory, PLO and the like for each connection to control a read clock for each connection, the present invention differs in that STM data streams sent from a plurality of connections are accumulated and processed in a single set of reassembly buffer memory, PLO and the like to realize delivery of correct STM data streams. Thus, according to the present invention, the adaptive clock method can be implemented without increasing the circuit scale.

Further, the clock calculating unit can correct the read clock for the frequency based on the amount of accumulated data associated with a previously failed connection when determining that the failed connection is switched back to a normal operating state, so that the clock restoring unit can restore the read clock based on a frequency corrected in the clock calculating unit.

Therefore, the reception of data from a normal connection is also ensured not only when an operating connection is disconnected or failed but also when a faulty connection is subsequently switched back to a normal operating state, thereby ensuring the amounts of accumulated data received from the normal connections, and the clock restored from the amounts of accumulated data. This enables correct delivery of STM data streams.

Since a target value for the amount of accumulated data in the reassembly buffer memory is calculated for each connection based on the line rate for the connection, and CDV in the ATM network, it is possible to take action, for example, the exclusion of a target value for the amount of accumulated data associated with a faulty connection from those for use in the calculation for correcting the read clock.

It is therefore possible to avoid an evil influence of data associated with a faulty connection which would cause anomalous frequency of the read clock that would prevent correct transmission of even data associated with other normal connections to a destination STM network.

Further, an ATM telecommunication system having a circuit emulation service device which is equipped a reassembly device comprising a reassembly buffer memory, a PLO and the like shared by a plurality of connections, can transmits STM data stream correctly to a destination STM network based on data sent by normal connection, even if one or more connection fell in fail.

What is claimed is:

1. A network device comprising:
   a connection unit to establish a set of connections to a plurality of communication lines associated with a source network and determine a failed and a normal operating state of the connections;
   a buffer to accumulate data from packets received from the connection unit;
   a first controller to determine a target value for accumulated data associated with the connections;
   a clock unit to generate a read clock for reading the accumulated data from the buffer; and
   a second controller to determine a frequency of the read clock for one of the connections in a normal operating state based on an amount of the accumulated data associated with the one connection, the target value associated with the one connection, and the normal operating state of the one connection.

2. The network device of claim 1, further comprising:
   a read unit to read at least some of the accumulated data associated with the one connection from the buffer based on the generated read clock and forward the at least some of the accumulated data to a destination network, wherein a type of the source network and a type of the destination network differ.

3. The network device of claim 2, wherein the determined frequency is based on a line rate associated with one of the communication lines and a line rate associated with a destination network.

4. The network device of claim 1, wherein the second controller is configured to determine the frequency before an initial operation of the one connection.

5. The network device of claim 1, further comprising:
   a counter unit to maintain the amount of accumulated data.

6. The network device of claim 1, wherein the connection unit is configured to detect a fault associated with the one connection based on at least one of an OAM (operations, administration and maintenance) alarm, a header error control error, or a sequence error.

7. The network device of claim 1, wherein the connection unit is configured to notify the second controller when the operating state of the one connection is abnormal.

8. The network device of claim 7, wherein the second controller is configured to disregard the amount of the accumulated data in determining the frequency upon receiving notification of the abnormal state.

9. The network device of claim 8, wherein the connection unit is configured to notify the second controller when the operating state of the one connection returns to normal.

10. The network device of claim 9, wherein the second controller is configured to resume determining the frequency based on the amount of the accumulated data upon receiving notification of the return to the normal operating state.

11. The network device of claim 1, wherein the frequency is set to a first value when the amount of the accumulated data is less than the target value and to a second value when the amount of the accumulated data exceeds the target value, the first value being lower than the second value.

12. The network device of claim 1, further comprising:
    a read unit to:
       read out, from the buffer, the accumulated data associated with the one connection when the amount of the accumulated data exceeds the target value, and
       read out dummy data instead of the accumulated data associated with the one connection when the amount of the accumulated data is less than the target value.

13. A method comprising:
    establishing a set of connections to respective communication lines associated with a first type of network;
    buffering data received via the connections;
    presetting a target value indicative of an amount of buffered data associated with each of the connections;
    monitoring a failed and a normal operating state of each of the connections; and
    establishing a read clock for reading out the buffered data based on current amounts of buffered data, target values, and the normal operating state of the connections.

14. The method of claim 13, further comprising:
    reading out the buffered data for connections in a normal operating state based on the read clock; and
    forwarding the read data to a second type of a network.

15. The method of claim 14, wherein the presetting the target value is based on line values of the respective communication lines and line values of communication lines corresponding to the second type of network.

16. The method of claim 13, further comprising:
    detecting a fault associated with one or more of the connections; and
    adjusting the read clock based on the detected fault.

17. The method of claim 16, further comprising:
    detecting an absence of the fault; and
    re-adjusting the read clock based on the detected absence of the fault.

18. The method of claim 16, wherein the detecting the fault comprises detecting at least one of an OAM (operations, administration and maintenance) alarm, a header error control error, or a sequence error.

19. The method of claim 13, further comprising:
    establishing a first frequency for the read clock when the current amount of buffered data for one of the connections is less than the target value for the one connection; and
    increasing the first frequency to a second frequency when the current amount of buffered data for the one connection exceeds the target value.

20. A system for reassembling data packets, comprising:
    means for connecting to a plurality of communication lines via which data packets are received from a first type of a network;

means for detecting when faults occur with respect to each of the communication lines;

means for accumulating the received packets;

means for establishing target amounts of the accumulated packets associated with each of the communication lines;

means for determining accumulated packet levels associated with each of the communication lines;

means for establishing a read clock based on the accumulated packet levels, the target amounts, and the detected faults; and means for reading out the accumulated data based on the read clock and forwarding the read data to a second type of network.

* * * * *